(12) United States Patent
Ronkainen

(10) Patent No.: US 9,195,349 B2
(45) Date of Patent: Nov. 24, 2015

(54) APPARATUS, METHOD AND COMPUTER PROGRAM USING A PROXIMITY DETECTOR

(75) Inventor: Sami Pekka Ronkainen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 197 days.

(21) Appl. No.: 13/277,922

(22) Filed: Oct. 20, 2011

(65) Prior Publication Data

US 2013/0100064 A1 Apr. 25, 2013

(51) Int. Cl.
G06F 3/044 (2006.01)

(52) U.S. Cl.
CPC ...... *G06F 3/044* (2013.01); *G06F 2203/04108* (2013.01)

(58) Field of Classification Search
CPC ... G06F 3/044; G06F 3/0488; G06F 3/04883; G06F 3/041; G06F 2203/04101; G06F 3/0412; G06F 3/04886; G06F 3/0416; G06F 2203/04104; G06F 3/017; G06F 3/03547
USPC .................. 345/173, 174; 178/18.01–18.11; 715/862, 863
See application file for complete search history.

(56) References Cited

U.S. PATENT DOCUMENTS

| 6,459,424 | B1 | 10/2002 | Resman | |
|---|---|---|---|---|
| 2003/0210286 | A1 | 11/2003 | Gerpheide et al. | |
| 2007/0229468 | A1* | 10/2007 | Peng et al. | 345/173 |
| 2008/0122798 | A1* | 5/2008 | Koshiyama et al. | 345/173 |
| 2008/0158172 | A1* | 7/2008 | Hotelling et al. | 345/173 |
| 2008/0165132 | A1 | 7/2008 | Weiss et al. | |
| 2009/0231295 | A1 | 9/2009 | Petit et al. | |
| 2009/0309851 | A1* | 12/2009 | Bernstein | 345/174 |
| 2009/0315922 | A1 | 12/2009 | Lee | |
| 2010/0001967 | A1* | 1/2010 | Yoo | 345/173 |
| 2010/0046766 | A1 | 2/2010 | Gregg et al. | |
| 2010/0141684 | A1 | 6/2010 | Machida | |
| 2011/0066984 | A1 | 3/2011 | Li | |
| 2011/0109577 | A1* | 5/2011 | Lee et al. | 345/173 |
| 2011/0163966 | A1 | 7/2011 | Chaudhri | |
| 2011/0267310 | A1* | 11/2011 | Tsukahara et al. | 345/174 |
| 2011/0312349 | A1* | 12/2011 | Forutanpour et al. | 455/466 |
| 2012/0001945 | A1* | 1/2012 | Oakley | 345/672 |
| 2012/0137253 | A1* | 5/2012 | Eom et al. | 715/835 |

FOREIGN PATENT DOCUMENTS

| EP | 2 101 253 A1 | 9/2009 |
|---|---|---|
| EP | 2 124 138 A2 | 11/2009 |
| EP | 2 323 023 A2 | 5/2011 |

(Continued)

OTHER PUBLICATIONS

International Search Report and Written Opinion for Application No. PCT/FI2012/051279, dated May 10, 2013.

(Continued)

*Primary Examiner* — Koosha Sharifi-Tafreshi
(74) *Attorney, Agent, or Firm* — Alston & Bird LLP

(57) ABSTRACT

An apparatus comprising: at least one proximity detector configured to disambiguate different user actuations proximal to the proximity detector; wherein, the apparatus is configured to use the at least one proximity detector in a high definition mode to disambiguate a first set of user actuations and wherein, the apparatus is configured to use, in response to detection of a first criteria, the at least one proximity detector in a low definition mode to disambiguate a second, smaller set of user actuations.

25 Claims, 3 Drawing Sheets

(56) References Cited

FOREIGN PATENT DOCUMENTS

| WO | WO 2008/062217 A2 | 5/2008 |
| WO | WO 2011/036492 A2 | 3/2011 |

OTHER PUBLICATIONS

FingerCloud [online] [retrieved May 10, 2011]. Retreived from the Internet: <URL: http://dl.acm.org/citation.cfm?id=1753326.1753412>, 2 pages.

Cypress touchscreens track hovering fingers, make devices even more 'magical' (video) [online] [retrieved May 10, 2011]. Retrieved from the Internet: <URL: http://www.engadget.com/2010/04/23/cypress-touchscreens-track-hovering-fingers-m . . . >, 4 pages.

Two Extremes of Touch Interaction—Microsoft Research [online][retrieved Oct. 19, 2011]. Retrieved from the Internet: <URL: http://research.microsoft.com/en/us/news/features/touch-101711.aspx>, 4 pages.

*Hold on to your patents: Microsoft 'PocketTouch' enables device input through fabric*, GeekWire, Oct. 17, 2011, 12 pages.

*Microsoft Research demo: Augmented reality with Kinect, tablet, distributed computing*, GeekWire, Sep. 27, 2011, 12 pages.

*PocketTouch: through-fabric capacitive touch input*, ACM Digital Library, (2011), 1 page.

Partial International Search Report for Application No. PCT/FI2012/051279 dated Feb. 28, 2013.

Kim, J., et al., *The Gesture Watch: A Wireless Contact-Free Gesture Based Wrist Interference*, 11$^{th}$ IEEE International Symposium on Wearable Computers (2007) pp. 15-22.

International Search Report and Written Opinion for Application No. PCT/IB2012/055759, dated Jul. 9, 2013.

Extended European Search Report for corresponding European Application No. 12842080.9 dated Apr. 24, 2015, 6 pages.

\* cited by examiner

APPARATUS, METHOD AND COMPUTER PROGRAM USING A PROXIMITY DETECTOR

TECHNOLOGICAL FIELD

Embodiments of the present invention relate to an apparatus, a method and a computer program using a proximity detector.

BACKGROUND

Proximity detectors such as touch sensitive displays are commonly used in portable electronic apparatus such as tablet computers and smart phones.

Such proximity detectors typically operate in a high definition mode where they are used to disambiguate between numerous different high definition user actuations.

If one draws an analogy between proximity detection and displaying text characters, then when proximity detectors operate in a high definition mode that is the equivalent of using a small font size. Each sensor-element occupies a small area and there are a large number of sensor elements per unit area.

BRIEF SUMMARY

It would be desirable to use proximity detectors to enable user input over a greater range of scenarios. It is not always possible or convenient to provide high definition user actuations. For example, it may not always be possible to perform or detect precisely executed high definition standard user actuations. This may for example occur if the proximity detector is shielded by clothing.

According to various, but not necessarily all, embodiments of the invention there is provided an apparatus comprising: at least one proximity detector configured to disambiguate different user actuations proximal to the proximity detector; wherein, the apparatus is configured to use the at least one proximity detector in a high definition mode to disambiguate a first set of user actuations and wherein, the apparatus is configured to use, in response to detection of a first criteria, the at least one proximity detector in a low definition mode to disambiguate a second, smaller set of user actuations.

According to various, but not necessarily all, embodiments of the invention there is provided an apparatus comprising: at least one processor; and at least one memory including computer program code the at least one memory and the computer program code configured to, with the at least one processor, cause the apparatus at least to perform detecting a first criteria; controlling switching from using at least one proximity detector in a high definition mode to disambiguate a first set of user actuations to using the at least one proximity detector in a low definition mode to disambiguate a second, smaller set of user actuations instead of the first set of user actuations.

According to various, but not necessarily all, embodiments of the invention there is provided an apparatus comprising: means for detecting a first criteria; means for controlling switching from using at least one proximity detector in a high definition mode to disambiguate a first set of user actuations to using the at least one proximity detector in a low definition mode to disambiguate a second, smaller set of user actuations instead of the first set of user actuations.

According to various, but not necessarily all, embodiments of the invention there is provided an apparatus comprising: at least one processor; and at least one memory including computer program code the at least one memory and the computer program code configured to, with the at least one processor, cause the apparatus at least to perform detecting a first criteria; controlling switching to using the at least one proximity detector to disambiguate a set of user actuations comprising only un-tethered relative sweep gestures.

BRIEF DESCRIPTION

For a better understanding of various examples of embodiments of the present invention reference will now be made by way of example only to the accompanying drawings in which:

FIG. 1 schematically illustrates an apparatus comprising a proximity detector;

DETAILED DESCRIPTION

The Figures illustrate an apparatus 2 comprising: at least one proximity detector 4 configured to disambiguate different user actuations 14 proximal to the proximity detector 4; wherein, the apparatus 2 is configured to use the at least one proximity detector 4 in a high definition mode to disambiguate a first set of user actuations and wherein, the apparatus 2 is configured to use, in response to detection of a first criteria, the at least one proximity detector 4 in a low definition mode to disambiguate a second, smaller set of user actuations.

After detection of the first criteria the apparatus 2 switches automatically from using the at least one proximity detector 4 in a high definition mode to disambiguate a first set of user actuations to using the at least one proximity detector 4 in a low definition mode to disambiguate a second, smaller set of user actuations instead of the first set of user actuations.

Although the term criteria is normally used to indicate more than one criterion, in this document the term 'criteria' should be understood to indicate one or more criterion.

The terms 'definition' and 'spatial resolution' are synonymous. The term high definition when used in the context of detection or actuation means that there is a high information content per unit area, that is, there is a high spatial resolution. The term low definition when used in the context of detection or actuation means that there is a low information content per unit area, that is, there is a low spatial resolution. The relationship between low spatial resolution and high spatial resolution is such that the information content per area for high spatial resolution may be more than 4, 16, or even 64 times greater than the information content per area for low spatial resolution.

Figure 1:
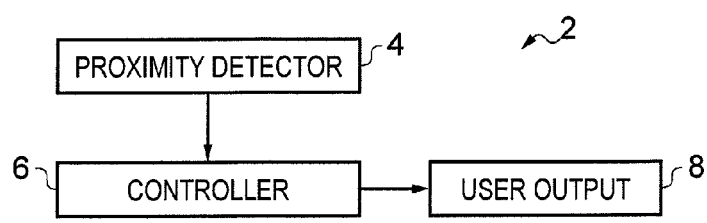

FIG. 1 schematically illustrates an apparatus 2. The apparatus 2 comprises a proximity detector 4, a controller 6 and a user output device 8.

The apparatus 2 may, for example, be an electronic apparatus such as a personal digital assistant, personal media player, mobile cellular telephone, personal computer, a point of sale terminal etc. In some embodiments the apparatus 2 may be a hand-portable apparatus, that is, an apparatus that is sized to be carried in the palm of a hand or in a jacket pocket.

The proximity detector 4 may comprise one or a plurality of proximity sensors. For example, the proximity detector may be a touch screen that detects the location of a touch gesture at or above the screen. The touch screen may, for example, be used in combination with a display as a touch screen display.

The proximity detection performed by the proximity detector 4 may rely on capacitive sensing using one or more capacitive sensors arranged as an array.

The proximity detector 4 is configured to disambiguate different user actuations proximal to the proximity detector 4. That is, the proximity detector 4 is configured to provide outputs to the controller 6 that enables recognition of and differentiation between different user actuations. Each different user actuation can therefore be used to reference a different user input command.

The controller 6 is configured to receive the outputs from the proximity detector 4. It processes the received outputs, recognising the output received as indicative of a particular detected user actuation and performs the appropriate command associated with that user actuation.

The apparatus 2 can operate in a high definition mode or a low definition mode.

The particular definition mode that is operational may affect the outputs from the proximity detector 4 and/or affect the processing of the outputs by the controller 6.

In the high definition mode the outputs of the proximity detector 4 are used to disambiguate a first set of user actuations and perform the command associated with the user actuation.

In the low definition mode the outputs of the proximity detector 4 are used to disambiguate a second, smaller set of user actuations and perform the command associated with the user actuation.

In some embodiments the first set of user actuations and the second set of user actuations are exclusive, non-intersecting sets. The first set of user actuations may include high definition user actuations and low definition user actuations. The second set of user actuations may include only low definition user actuations.

The apparatus 2 is configured to switch, in response to detection of a first criteria, from using the proximity detector 4 in a high definition mode to disambiguate a first set of user actuations to using the proximity detector 4 in a low definition mode to disambiguate a second, smaller set of user actuations instead of the first set of user actuations.

The apparatus 2 is configured to switch, in response to detection of a second criteria, from using the proximity detector 4 in a low definition mode to disambiguate the second, smaller set of user actuations to using the proximity detector 4 in a high definition mode to disambiguate the first larger set of user actuations instead of the second set of user actuations.

The detection the first criteria and the second criteria may involve one or more criteria detectors. The proximity detector 4 may, optionally, be used as a criteria detector. Alternatively or additionally, other proximity detection may be performed e.g. optical or ultrasound sensing using one or more sensors. Typically a transmitter will be used as a source of waves (e.g. infrared light or ultrasound) and a receiver will be used to detect waves reflected by a proximal object. If more than one proximity detector 4 is used they may sense the same characteristic (e.g. capacitance, reflected light or reflected ultrasound) or different characteristics.

Figure 2:
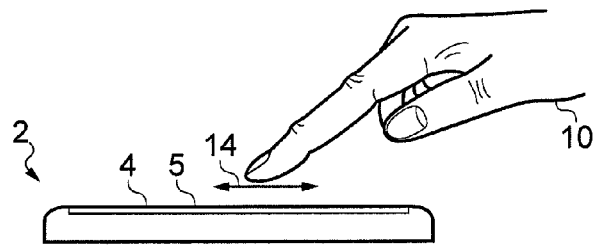
FIG. 2 illustrates using the proximity detector in a high definition mode to disambiguate a first set of high definition user actuations.

FIG. 2 illustrates a situation in which the apparatus 2 is using the proximity detector 4 in a high definition mode to disambiguate a first set of user actuations 14. The user actuations 14 are, in this example, hand gestures made by a hand 10 and the proximity detector 4 is, in this example, a touch sensitive display. The proximity detector 4 enables touch input over a display 5 which is enabled when the at least one proximity detector is used in the high definition mode.

Figure 3:
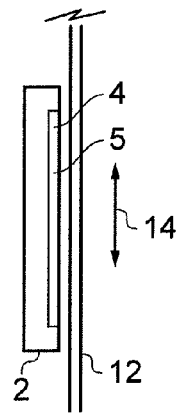
FIG. 3 illustrates using the proximity detector 4 in a low definition mode to disambiguate a second set of low definition user actuations.

FIG. 3 illustrates a situation in which the apparatus 2 is using the proximity detector 4 in a low definition mode to disambiguate a second set of user actuations 14. The user actuations are, in this example, hand gestures and the proximity detector 4 is, in this example, a touch sensitive display. The proximity detector 4 enables touch input over a display 5.

The display 5 may be in a low power consumption mode when the proximity detector 4 is used in the low definition mode. As an example, the display 5 may be disabled.

In FIG. 3, a piece of clothing 12 is positioned between the user actuations 14 and the proximity detector 4. The clothing may be any suitable clothing material such as fabric, cloth, clothes, apparel etc.

The proximity detector 4 in the low definition mode is configured to disambiguate accurately the second, smaller set of user actuations 14 despite being separated from the at least one proximity detector 4 by the clothing 12.

This may be achieved by increasing the detection sensitivity of the proximity detector 4 when it is in the low definition mode. This increase in sensitivity may be controlled at the proximity detector 4 itself or controlled during processing outputs from the proximity detector 4.

For example, a detection event may be triggered by user actuations at a greater distance from the proximity detector 4 in the low definition mode than the high definition mode. This increased sensitivity will decrease spatial resolution (definition).

For example, the proximity detector 4 may have a higher gain in the low definition mode than the high definition mode making it more sensitive. The higher gain may, for example, be obtained by amplifying output signals from proximity detector 4 or be obtained by integrating output signals from adjacent proximity detectors 4 or adjacent groups of sensors within a proximity detector 4.

Figure 4A:
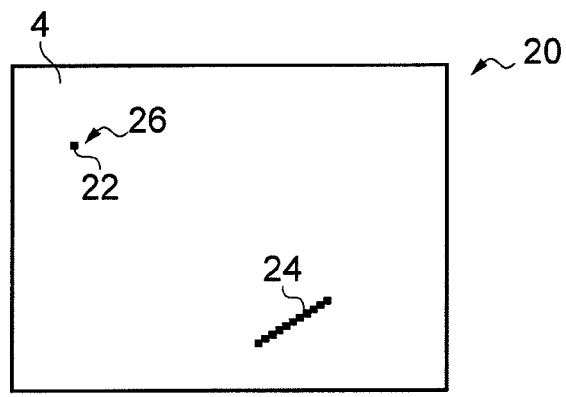
FIG. 4A illustrates how individual sensor elements of a proximity detector are used in the high definition mode to sense high definition user actuations.
Figure 4B:
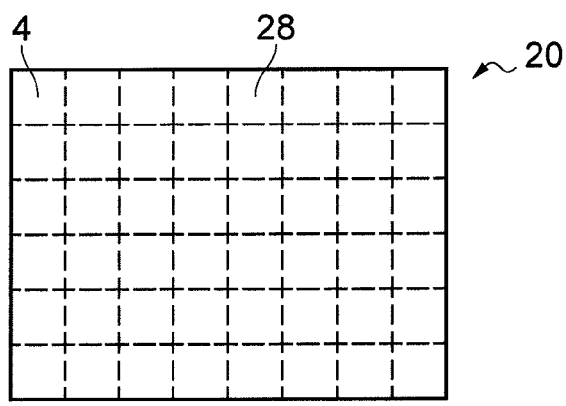
FIG. 4B illustrates how groups of individual sensor elements of a proximity detector are used in the low definition mode to sense low definition user actuations.

FIGS. 4A and 4B illustrate proximity detector arrangement that comprises an N×M array of proximity sensor-elements 26. Each sensor element is small, less than 0.5 cm by 0.5 cm. The centers of adjacent sensor elements in a row or column of the array are separated by less than 1 cm.

In the high definition mode illustrated in FIG. 4A each sensor element operates as a proximity detector 4. The proximity detectors 4 are able to disambiguate an instantaneous user actuation at a first location (e.g. a touch) from an instantaneous user actuation at a second location (e.g. a touch) separated from the first location by less than 0.5 cm.

In the high definition mode, a user may therefore be able to actuate individual sensor elements distinctly using separate user actuations. The user actuation can therefore be confined to a small area at an instant in time, for example as an instantaneous input point 22. The user actuation 14 can also extend over a series of small contiguous areas over time, for example as a trace input point 24.

In the low definition mode, illustrated in FIG. 4B, the N×M sensor elements are used as n×m groups 28 of sensor elements. Each group 28 of sensor elements is an array of N/n× M/m array of sensor elements. n and m are >>1.

Each group 28 of sensor elements operates as a proximity detector 4. This may, for example, be achieved by using output from only one sensor element in a group 28 or by combining all outputs of the sensor elements in a group 28.

The size (area) of a group 28 is significantly greater than the size (area) of a sensor element. In the low definition mode there are therefore less proximity sensors 4 per unit area. The groups 28 may not therefore be able to disambiguate a high definition user actuation such as an instantaneous user actuation at a first location from an instantaneous user actuation at a second location separated from the first location by less than 0.5 cm.

However, a low definition user actuations can be disambiguated. A low definition user actuation 14 can extend over a series of groups 28 over time, for example as a sweep input. A differentiating characteristic of a sweep input is a characteristic of its direction rather than a particular start or end point. As the sweep input does not depend on a particular start point or end point it may be described as an 'un-tethered' or 'relative' input. Suitable example characteristics may be 'outward', 'inward', 'counter-clockwise' or 'clock-wise' (FIGS. 5A, 5B, 6A, 6B). These characteristics are large scale and can be performed by a user without the user being able to view the apparatus because, for example, it is in a jacket pocket.

Figure 5A:
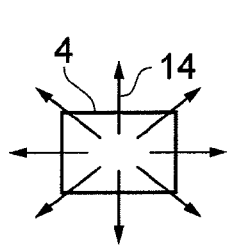
FIG. 5A illustrates an example of an outward sweep low definition user actuation.

FIG. 5A illustrates an example of an outward sweep low definition user actuation 14. It is a large scale gesture that starts within a boundary of the touch sensitive display 5 and moves outward away from a central area of the touch sensitive display.

Figure 5B:
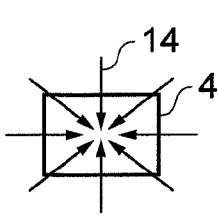
FIG. 5B illustrates an example of an inward sweep low definition user actuation.

FIG. 5B illustrates an example of an inward sweep low definition user actuation 14. It is a large scale gesture that inwards towards a central area of the touch sensitive display.

Figure 6A:
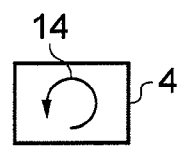
FIG. 6A illustrates an example of an counter-clockwise sweep low definition user actuation.

FIG. 6A illustrates an example of an counter-clockwise sweep low definition user actuation 14. It is a large scale gesture that moves in a counter-clockwise direction around a central area of the touch sensitive display.

Figure 6B:
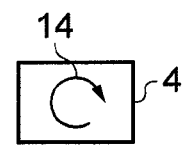
FIG. 6B illustrates an example of an clockwise sweep low definition user actuation.

FIG. 6B illustrates an example of an clockwise sweep low definition user actuation 14. It is a large scale gesture that moves in a clockwise direction around a central area of the touch sensitive display.

Figure 5C:
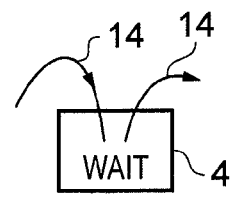
FIG. 5C illustrates an example of a cover-uncover low definition user actuation.

FIG. 5C illustrates an example of a cover-uncover low definition user actuation 14. It is a large scale gesture that starts with a significant portion of the touch sensitive display 5 being covered by a user's hand for a prolonged period and then being moved away.

Figure 7:
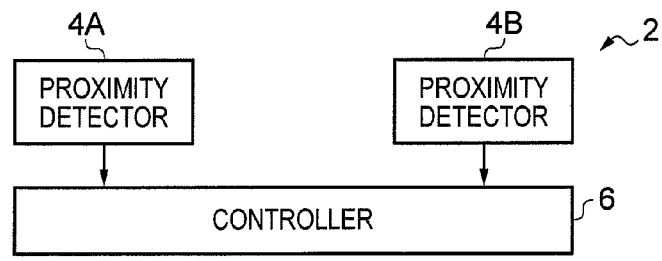
FIG. 7 illustrates an apparatus similar to that illustrated in FIG. 1 comprising two distinct proximity detectors.

FIG. 7 illustrates an apparatus 2 similar to that illustrated in FIG. 1. In this example, the apparatus 2 has two distinct proximity detectors 4A, 4B. Either one of the proximity detectors 4A, 4B may operate as the proximity detector 4 described above. The other proximity detector may be used, for example, in determining whether or not the first criteria is satisfied.

Figure 8:
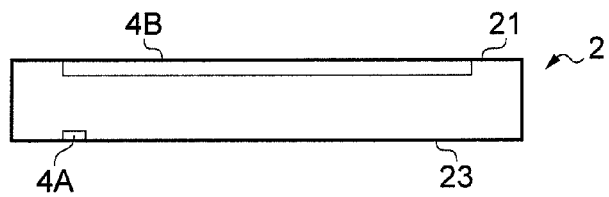
FIG. 8 illustrates an example of the apparatus illustrated in FIG. 7 in cross-section.

FIG. 8 illustrates an example of the apparatus 2 illustrated in FIG. 7 in cross-section. The apparatus 2 has a font face 21 and an opposing back face 23. One or more first proximity sensors 4B are positioned on the front face 21 of the apparatus. One of the first proximity sensors 4A may be similar to the user-input proximity sensor 4 previously described. It may for example be a touch sensitive display. A second proximity sensor 4A is positioned on the back face 23 of the apparatus 2.

The detection of the first criteria and/or the second criteria may involve one or more of the first proximity detectors and/or the second proximity detectors. If so, the proximity detectors 4A, 4B are being used as criteria detectors. Proximity criteria detectors may use capacitance sensing or optical or ultrasound sensing. For ultrasound or optical sensing, a transmitter (or an ambient external source) may be used as a source of waves (e.g. visible light, infrared light or ultrasound) and a receiver may be used to detect waves reflected by a proximal object. If more than one proximity criteria detector is used they may sense the same characteristic (e.g. capacitance, reflected light or reflected ultrasound) or different characteristics.

If the apparatus 2 illustrated in FIG. 8 were placed in a jacket pocket one would expect a proximity detection event to be recorded by the first proximity detector 4B and the second proximity detector 4A simultaneously. This may be a necessary or a sufficient condition for satisfying the first criteria.

Other conditions for satisfying the first criteria may be provided using additional sensors as criteria detectors. For example orientation may be measured using one or more of: accelerometers, a magnetometer, and a gyroscope.

Figure 9:
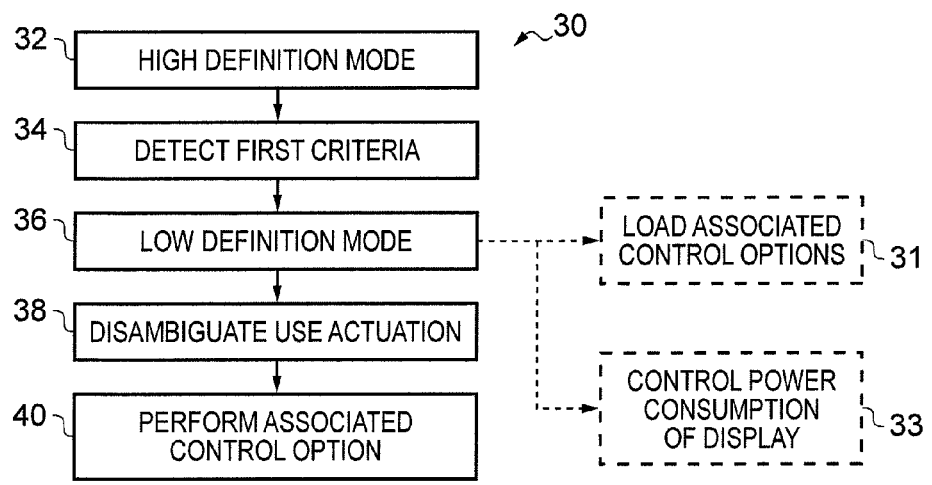
FIG. 9 illustrates a method for switching to a low definition mode to disambiguate the second set of user actuations.

FIG. 9 illustrates a method 30 for switching to a low definition mode to disambiguate the second set of low definition user actuations.

At block 32, the proximity detector 4 is being used in the high definition mode. In the high definition mode the proximity detector 4 is used to disambiguate a large first set of user actuations and perform associated control options.

The first set of user actuations may, for example, be used to start an application so that it is in-use, to stop an in-use application and/or to swap which application is in use. The first set of user actuations may, for example, be used to provide controls for the multiple different applications.

The proximity detector 4 may be configured to disambiguate high definition user actuations such as, for example, instantaneous user actuations at hundreds/thousand of distinct locations (e.g. touch inputs) and/or hundreds/thousands of different time variable user actuations (e.g. traces).

An input control option may be associated with each member of the first set of user actuations. The large number of user actuations in the first set enable a large number of different control options including options that enable a user to control selection of applications for use.

At block 34, if a first criteria is detected the method continues to block 36.

Although the term criteria is normally used to indicate more than one criterion, in this document the term 'criteria' should be understood to indicate one or more criterion. Examples of criteria are discussed in more detail below.

At block 36, the apparatus 2 switches from using the proximity detector 4 in the high definition mode to disambiguate the first set of user actuations to using the proximity detector 4 in a low definition mode to disambiguate a second, smaller set of low definition user actuations instead of the first set of user actuations.

At block 38, the apparatus 2 detects a low definition user actuation 14 and disambiguates the user actuation identifying it as a particular one of the second, smaller set of low definition user actuations. This step may occur at the proximity detector 4 itself or it may occur at the controller 6 or it may occur via cooperation of the proximity detector 4 and the controller 6.

At block 40, the apparatus 2 performs a control option that is associated with the identified user actuation of the second, smaller set of low definition user actuations.

The second, smaller set of low definition user actuations may be fixed (standardized) or it may be changed. For example, the second, smaller set of user actuations may be context dependent being dependent upon a context existing when the first criteria is detected. There may be a different second set of user actuations for each one of a plurality of different contexts. An example of a context is the identity of an application that is in-use when the first criteria is detected.

The control options associated with the second, smaller set of user actuations may be fixed or it may be changed. The associated set of control options may be dependent upon a context existing when the first criteria is detected. There may be a different set of control options for each one of a plurality of different contexts. An example of a context is the identity of an application that is in-use when the first criteria is detected.

In response to changing modes at block 36, the method 30 may optionally perform block 31. At block 31 a set of control options are associated with the second set of user actuations.

At block 31, a library of input control options is accessed using an identifier of the context. The identifier may, for example, identify an application that was in use when the first criteria was satisfied at block 34. The control options for the context are retrieved and used to convert a user actuation to a control option.

In one implementation, the second set of user actuations is dependent upon an application that is in-use when the first criteria is detected. The retrieved control options provide, for the current in-use application, a mapping (an association) between each particular user actuation of the second set of user actuations and a particular command for the in-use application. The commands enable user control of the in-use application but may not enable selection of a new application for use.

The first criteria may be dependent upon one or more of: a proximity detection trigger; an apparatus orientation trigger; and a user-locking trigger.

A proximity detection trigger is a trigger event that is activated when a particular proximity detection event occurs or a combination of proximity detection events occur. The proximity detection trigger may, for example, require a minimum duration of a user actuation and/or a minimum intensity (e.g. application area) of a user actuation. As an alternative or as an addition, the proximity detection trigger may, for example, require that proximity detection occurs at a front face 21 of the apparatus and a back face 23 of the apparatus 2 simultaneously.

An apparatus orientation trigger is a trigger event that is activated when a particular orientation of the apparatus 2 occurs. The orientation trigger may, for example, require a particular orientation of the apparatus for a minimum duration.

A user-locking trigger is a trigger event that is activated when a user applies a full or partial lock to the apparatus 2. The lock may, for example, prevent or restrict user input to the apparatus 2.

Alternatively, the first criteria may be satisfied when a particular sequential pattern of user actuations occur.

Alternatively, the first criteria may be satisfied when a particular sequential pattern of events occur that may, for example, be indicative of the apparatus 2 being stowed in a pocket.

One example of a sequential pattern of events be indicative of the apparatus 2 being stowed in a pocket is: an application is in-use, then the user applies a user lock to the apparatus while the application is in use, and then a stowage event occurs within a timeout period.

An example of a stowage event is that it is detected that the apparatus 2 has been continually adjacent another object since a timeout period following locking of the apparatus or adjacent objects at its front and back since a timeout period following locking of the apparatus.

Another example of a stowage event is that it is detected that the apparatus 2 has been continually in a vertical orientation since a timeout period following locking of the apparatus 2.

Another example of a stowage event is that it is detected that the apparatus 2 has been continually in a vertical orientation and adjacent an object (or objects) since a timeout period following locking of the apparatus 2.

In response to changing modes at block 36, the method 30 may optionally perform block 33. At block 33, power consumption of a display 5 is controlled. The display 5 may be placed in a low power consumption mode. As an example, the display 5 may be disabled.

At block 34, if a second criteria is detected rather than a first criteria the apparatus 2 may be configured to prevent use of the proximity detector 4 until the second criteria is no longer satisfied. The second criteria may, for example, be that the apparatus 2 is held adjacent a user's head to make or receive a telephone call or some other scenario that requires locking of the proximity detector to prevent inadvertent user input.

An example of how the apparatus 2 may be used will now be described. In this example, the second set of user actuations control audio output from an application such as a music player application for playing music tracks.

The second set of user actuations may comprise a first directional sweep actuation 14 for scrolling forward one music track to a next music track and playing that next music tack. Examples of a suitable first directional sweep actuations are illustrated in FIGS. 5A, 5B, 6A, 6B.

The second set of user actuations may comprise a second directional sweep actuation 14, different to the first directional sweep application, for scrolling backward one music track to a prior music track and playing that prior music tack. Examples of a suitable second directional sweep actuations are illustrated in FIGS. 5A, 5B, 6A, 6B.

The second set of user actuations comprise a cover-uncover actuation for controlling volume. An example is illustrated in FIG. 5C. The change in volume may be determined by a period of time for which a cover portion of the cover-uncover actuation occurs. The control may toggle between increasing volume and decreasing volume with each cover-uncover actuation. Thus when it is used first it decreases volume, when it is used next it increases volume, when it is used next it decreases volume. For safety and user comfort it may always initially decrease volume.

Implementation of controller 6 can be in hardware alone (a circuit, a processor . . . ), have certain aspects in software including firmware alone or can be a combination of hardware and software (including firmware).

The controller may be implemented using instructions that enable hardware functionality, for example, by using executable computer program instructions in a general-purpose or special-purpose processor that may be stored on a computer readable storage medium (disk, memory etc.) to be executed by such a processor.

Figure 10:
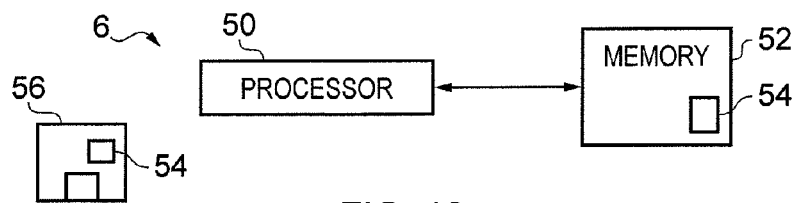
FIG. 10 illustrates an example of a controller comprising a processor.

FIG. 10 illustrates an example of a controller 6 comprising a processor 50. The processor 50 is configured to read from and write to the memory 52. The processor 50 may also comprise an output interface via which data and/or commands are output by the processor 50 and an input interface via which data and/or commands are input to the processor 50.

The memory 52 stores a computer program 54 comprising computer program instructions that control the operation of the apparatus 2 when loaded into the processor 50. The computer program instructions 54 provide the logic and routines that enables the apparatus to perform the methods described and illustrated, for example, in FIG. 9. The processor 50 by reading the memory 52 is able to load and execute the computer program 54.

The apparatus therefore comprises: at least one processor; and at least one memory including computer program code the at least one memory and the computer program code configured to, with the at least one processor, cause the apparatus at least to perform: detecting a first criteria; and controlling switching from using at least one proximity detector in a high definition mode to disambiguate a first set of user actuations to using the at least one proximity detector in a low definition mode to disambiguate a second, smaller set of user actuations instead of the first set of user actuations.

The computer program may arrive at the apparatus 2 via any suitable delivery mechanism. The delivery mechanism 56 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 54. The delivery mechanism may be a signal configured to reliably transfer the computer program 54. The apparatus 2 may propagate or transmit the computer program 54 as a computer data signal.

Although the memory 52 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The interconnection of components in a Figure indicates that they are operationally coupled and any number or combination of intervening elements can exist (including no intervening elements)

As used here 'module' refers to a unit or apparatus that excludes certain parts/components that would be added by an end manufacturer or a user. The proximity detector 4 may be a module 4, the controller 6 may be a module, the apparatus 2 may be a module.

The blocks illustrated in FIG. 9 may represent steps in a method and/or sections of code in the computer program 54. The illustration of a particular order to the blocks does not necessarily imply that there is a required or preferred order for the blocks and the order and arrangement of the block may be varied. Furthermore, it may be possible for some blocks to be omitted.

FIG. 9 schematically illustrates how an apparatus 2 switches, in response to detection of a first criteria, from using the proximity detector 4 in a high definition mode to disambiguate a first set of user actuations to using the proximity detector 4 in a low definition mode to disambiguate a second, smaller set of user actuations instead of the first set of user actuations.

With some simple modifications, FIG. 9 may also illustrate how the apparatus 2 is configured to switch, in response to detection of a second criteria, from using the proximity detector 4 in a low definition mode to disambiguate the second, smaller set of user actuations to using the proximity detector 4 in a high definition mode to disambiguate the first larger set of user actuations instead of the second set of user actuations.

As one example, after block 40, the method may return to block 34. If the first criteria is no longer detected, the method returns to block 32. In this example, the second criteria is an absence of the first criteria.

As an alternative example, after block 40, the method may return to block 34. If the first criteria is no longer detected and a second criteria is detected, then the method returns to block 32. In this example, the second criteria may be independent of the first criteria.

Although embodiments of the present invention have been described in the preceding paragraphs with reference to various examples, it should be appreciated that modifications to the examples given can be made without departing from the scope of the invention as claimed.

For example, the apparatus 2 may comprise: means for detecting a first criteria; and means for controlling switching from using at least one proximity detector in a high definition mode to disambiguate a first set of user actuations to using the at least one proximity detector in a low definition mode to disambiguate a second, smaller set of user actuations instead of the first set of user actuations.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
at least one proximity detector configured to disambiguate different user actuations proximal to the proximity detector, each different user actuation comprising a touch input at a different location or a different gesture;
wherein, the apparatus is configured to use the at least one proximity detector in a high definition mode to disambiguate a first user actuation of a first set of different user actuations from a second user actuation of the first set of different user actuations, and wherein, the apparatus is configured to use, in response to detection of a first criteria, the at least one proximity detector in a low definition mode to disambiguate a first user actuation of a second set of different user actuations from a second user actuation of the second set of different user actuations, wherein the first set of different actuations comprises a first number of different user actuations and the second set of different user actuations comprises a second number of different user actuations, the second number being smaller than the first number, wherein the apparatus is configured to associate an input control option with each member of the second set of different user actuations, wherein the input control options enable user control of an in-use application but do not enable selection of an application for use.

2. An apparatus as claimed in claim 1, wherein the different user actuations are different hand gestures.

3. An apparatus as claimed in claim 1, wherein the at least one proximity detector in a low definition mode is configured to disambiguate accurately the second set of different user actuations that are separated from the at least one proximity detector by clothing.

4. An apparatus as claimed in claim 1, wherein the at least one proximity detector is configured to be triggered by user actuations at a greater distance from the at least one proximity detector in the low definition mode than the high definition mode.

5. An apparatus as claimed in claim 1, wherein the at least one proximity detector is configured to have a higher gain in the low definition mode than the high definition mode.

6. An apparatus as claimed in claim 1, wherein the first set of different user actuations and the second set of different user actuations are exclusive, non-overlapping sets.

7. An apparatus as claimed in claim 1, comprising a display, wherein the at least one proximity detector enables touch input over the display.

8. An apparatus as claimed in claim 1, comprising:
at least one processor; and
at least one memory including computer program code;
the at least one memory and the computer program code configured to, with the at least one processor, cause the apparatus at least to perform:
detecting the first criteria; and
changing from using the at least one proximity detector in the high definition mode to using the at least one proximity detector in the low definition mode.

9. An apparatus comprising:
at least one proximity detector configured to disambiguate different user actuations proximal to the proximity detector, each different user actuation comprising a touch input at a different location or a different gesture;
wherein, the apparatus is configured to use the at least one proximity detector in a high definition mode to disambiguate a first user actuation of a first set of different user actuations from a second user actuation of the first set of different user actuations, and wherein, the apparatus is configured to use, in response to detection of a first criteria, the at least one proximity detector in a low definition mode to disambiguate a first user actuation of a second set of different user actuations from a second user actuation of the second set of different user actuations, wherein the first set of different actuations comprises a first number of different user actuations and the second set of different user actuations comprises a second number of different user actuations, the second number being smaller than the first number, wherein the at least one proximity detector in the high definition mode is configured to disambiguate an instantaneous user actuation at a first location from an instantaneous user actuation at a second location separated from the first location by less than 0.5 cm and wherein the at least one proximity detector in the low definition mode is not configured to disambiguate an instantaneous user actuation at the first location from an instantaneous user actuation at the second location separated from the first location by less than 0.5 cm.

10. An apparatus as claimed in claim 1, wherein the second set of different user actuations comprise direction sweeps.

11. An apparatus as claimed in claim 1, wherein the second set of different user actuations control audio output from an application for playing music tracks and the second set of different user actuations comprise a first low definition directional sweep actuation for scrolling forward one music track to a next music track and playing that next music track, and a second, different low definition directional sweep actuation for scrolling backwards one music track to a previous music track and playing that previous music track.

12. An apparatus as claimed in claim 11, wherein the second set of user actuations comprise a low definition cover-uncover actuation for controlling volume, wherein a change in volume is determined by a period of time for which a cover portion of the cover-uncover actuation occurs.

13. An apparatus as claimed in claim 12, wherein the cover-uncover actuation for controlling volume, toggles between increasing volume and decreasing volume with each cover-uncover actuation.

14. An apparatus as claimed in claim 1, wherein the first criteria is dependent upon one or more of:
a proximity detection trigger;
an apparatus orientation trigger; and
a user-locking trigger.

15. An apparatus as claimed in claim 1, wherein the first criteria requires: an application to be in use, the user to have applied a user lock to the apparatus, and the apparatus to detect that it has been continually adjacent another object since a timeout period.

16. An apparatus as claimed in claim 1, wherein the first criteria requires that the apparatus goes to a vertical orientation and stays there.

17. An apparatus as claimed in claim 1, wherein the apparatus is configured to use, in response to detection of the first criteria, the at least one proximity detector in a low definition mode to disambiguate the second set of different user actuations and wherein the apparatus is configured to use, in response to detection of a second criteria, the at least one proximity detector in a high definition mode to disambiguate the first set of different user actuations.

18. An apparatus as claimed in claim 17, wherein the second criteria is dependent upon one or more of: one or more proximity detection triggers and an apparatus orientation trigger.

19. A method comprising:
   detection of a first criteria; and
   switching from using at least one proximity detector in a high definition mode to disambiguate a first user actuation of a first set of different user actuations from a second user actuation of the first set of different user actuations to using the at least one proximity detector in a low definition mode to disambiguate a first user actuation of a second set of different user actuations from a second user actuation of the second set of different user actuations, wherein each different user actuation comprises a touch input at a different location or a different gesture, and the first set of different user actuations comprises a first number of user actuations and the second set of different user actuations comprises a second number of different user actuations, the second number being smaller than the first number, wherein the method comprises associating an input control option with each member of the second set of different user actuations, wherein the input control options enable user control of an in-use application but do not enable selection of an application for use.

20. A method as claimed in claim 19, wherein the different user actuations are different hand gestures and wherein the low definition mode enables user control of the apparatus through user clothing.

21. A method as claimed in claim 19, further comprising reducing power consumption of a display when the at least one proximity detector is in the low definition mode.

22. A method as claimed in claim 19, further comprising detection of second criteria; and switching from using the at least one proximity detector in the low definition mode to disambiguate the second set of different user actuations to using the at least one proximity detector in the high definition mode to disambiguate the first set of different user actuations instead of the second set of different user actuations.

23. An apparatus comprising:
   at least one processor; and
   at least one memory including computer program code, the at least one memory and the computer program code configured to, with the at least one processor, cause the apparatus at least to perform:
   detecting a first criteria; and
   controlling switching from using at least one proximity detector in a high definition mode to disambiguate a first user actuation of a first set of different user actuations from a second user actuation of the first set of different user actuations to using the at least one proximity detector in a low definition mode to disambiguate a first user actuation of a second set of different user actuations from a second user actuation of the second set of different user actuations, wherein each different user actuation comprises a touch input at a different location or a different gesture, and the first set of different user actuations comprises a first number of different user actuations and the second set of different user actuations comprises a second number of different user actuations, the second number being smaller than the first number, wherein the apparatus is configured to associate an input control option with each member of the second set of different user actuations, wherein the input control options enable user control of an in-use application but do not enable selection of an application for use.

24. An apparatus as claimed in claim 23 wherein the second set of user actuations comprises only un-tethered relative sweep gestures.

25. An apparatus as claimed in claim 1, wherein the first criteria is dependent upon activation of a user-locking trigger that is activated when a user applies a lock to the apparatus.

* * * * *